Sept. 26, 1939.  P. RYAN  2,174,197
ENDGATE FOR VEHICLES
Filed Nov. 18, 1938
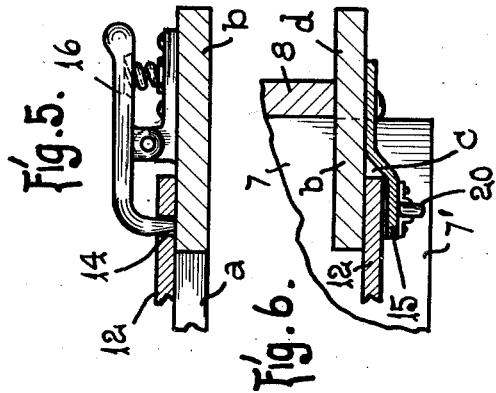
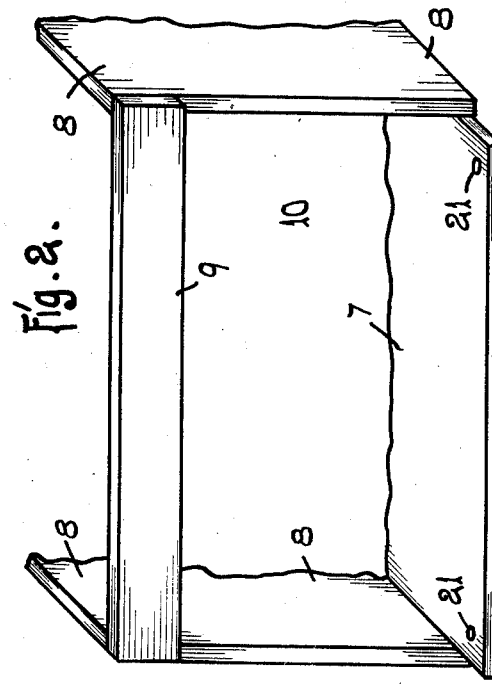
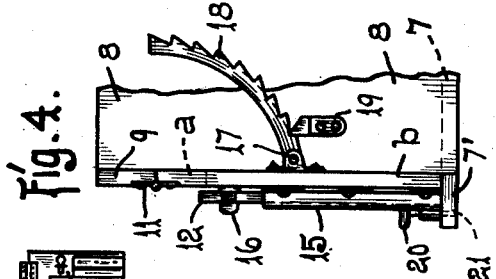
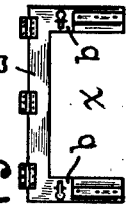
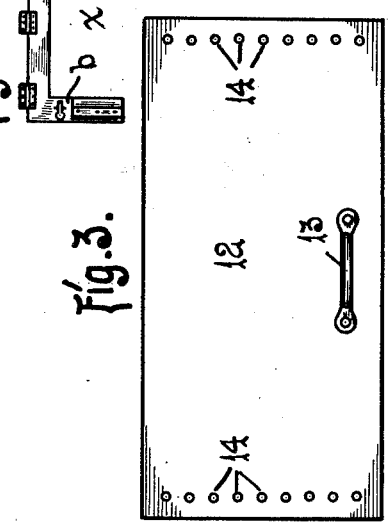
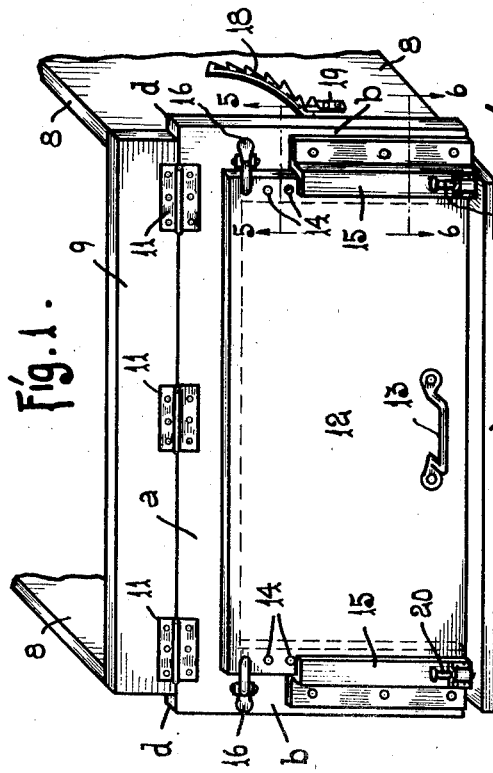
Inventor
By Patrick Ryan
Hiram A. Sturges  Attorney Patented Sept. 26, 1939

2,174,197

UNITED STATES PATENT OFFICE 2,174,197

ENDGATE FOR VEHICLES

Patrick Ryan, Bell, Calif.

Application November 18, 1938, Serial No. 241,230

1 Claim. (Cl. 296—51)

This invention relates to an end gate for trucks or other vehicles used generally for hauling materials, and has reference particularly to an end gate which will facilitate unloading of grain, gravel and various kinds of small articles of merchandise, and will operate to advantage for unloading or dumping larger articles, such as brick, coal or lumber, the parts of the end gate to be few and simple and of such arrangement that adjustments will be convenient in operation.

The invention consists of the new and useful construction, combination and arrangement of parts as described herein and claimed, and as shown in the accompanying drawing, it being understood that changes may be made in form, size, proportions and minor details, said changes being within the scope of the invention as claimed.

In the drawing, Fig. 1 is a perspective view showing an end-portion of a vehicle body with an end gate mounted thereon in closed position, and Fig. 2 is a similar view with the end gate removed.

Fig. 3 is a side view of a slide-plate for the end gate.

Fig. 4 is a broken away side view showing an end-portion of the vehicle body, the end gate being shown in closed position.

Fig. 5 is an enlarged detail, being a section on line 5—5 of Fig. 1, showing a spring-latch.

Fig. 6 is an enlarged detail being a sectional view on line 6—6 of Fig. 1, showing a vertical guide for the slide-plate, and Fig. 7 is a side view on a reduced scale, showing a gate-frame.

Referring now to the drawing for a more particular description, the invention is described in connection with the bottom 7 and sides 8 of a vehicle body rectangular in cross-section, said body being provided at its rear end with a horizontal stabilizing strip 9 above its end-opening 10, and its bottom being provided with an extension 7' which projects rearwardly of the sides 8.

The end gate consists, in part, of a gate-frame $x$ of inverted U-shape form, indicated by dotted lines in Fig. 1, the horizontal upper part $a$ being mounted to swing from the reinforcing strip 9 of the vehicle body by means of hinges 11, the vertical end-portions $b$ of said frame being of such widths that they normally project laterally beyond the sides 8 of said vehicle body.

Numeral 12 indicates a vertically disposed slide-plate or gate-member provided with a handle 13 and also provided with numerous, uniformly spaced vertically arranged apertures 14, said plate, by use of its handle 13 being adapted to be moved upwardly or downwardly in guide-members 15, said guides consisting simply of vertical strips secured to the opposed portions $b$ of the swingable gate-frame, each strip having a transverse curvature to provide a channel $c$ for receiving an edge-portion of the slide-plate.

It will be seen that the gate-frame, together with the slide-plate, may make a complete closure of the opening 10 of the vehicle body, the slide-plate and lower ends of the parts $b$ of the gate-frame engaging the extension 7' when the device is disposed in closed position.

At 16 is indicated a pair of conventional spring-latches which are mounted on the gate-frame, and normally they will be pressed into engagement with the slide-plate, and their prongs may enter the apertures 14 of the slide-plate for locking said plate in a closed position, and when it is desired to elevate this plate the latches may be manually adjusted in a well known manner for releasing the latches from the apertures 14.

The gate-frame is of such proportion that its parts $b$ project laterally beyond the sides of the vehicle body, and pivotally mounted at 17, upon the lateral extensions or projecting parts $d$ thereof, is a pair of ratchet bars 18 under control of pawls 19 which are mounted on the sides 8 of the vehicle body.

Numerals 20 indicate a pair of bolts which are provided for the lower parts of the guide members 15, and after the end-gate has been swung to closed position these bolts may be moved into apertures 21 which are formed in the extension 7' of the bottom 7.

In operation, after releasing the bolts, the end-gate may be swung upwardly a selected distance by use of the handle 13 to permit unloading, and the gate will be held in open position by the pawls which engage in the notches of the curved ratchet-bars. For moving the end-gate to closed position, the bars 18 may be manually swung upwardly from the pawls. While only one ratchet-bar 18 is shown in the drawing, two of these bars are preferably used, their mounting and operation being similar in all respects. However, one of the ratchet-bars may be dispensed with if desired.

It will be understood that when the end-gate is disposed in closed position, the lower edges of the gate-frame and slide-plate will engage the upper surface of the extension 7' of the floor of the vehicle body. When unloading or dumping grain, the small door or slide-plate 12 is elevated a suitable distance, and the outward sliding movement of said grain will be under control for a part of the load, and thereafter the entire end-gate may be elevated so that the remainder of the contents may be removed.

It will be noted that the objectionable vertical ridges and grooves generally used upon the inner surfaces of the vehicle body for a mounting of the end-gate are avoided, and therefore there will be no obstructions for a free movement of the contents while unloading, and when loaded with grain or similar material, leakage will not occur since the parts b of the gate-frame will be pressed against the end-portions of the vehicle body. Also, since there are no obstructions on the bottom 7, or upon the inner surfaces of the sides 8 of the vehicle body, these parts may be swept clean and kept in a sanitary condition.

It is believed the use of the end-gate, as described, will be appreciated in the transportation of small grain or similar products for the reason that waste of the load during the operation of dumping may be prevented, the movement or flow of the contents being under control of the adjustable slide-plate.

I claim as my invention:

An end gate for a vehicle body of rectangular form in cross-section having an apertured floor portion extending rearwardly of its sides and a horizontal stabilizing strip above its open end, an elongated gate frame of inverted U-shape having a length greater than the width of the vehicle body, a pair of opposed guide-strips secured to the arms of the gate frame, an elongated gate member provided with a handle and having numerous uniformly spaced apertures in its ends slidably engaging and having a part normally projecting above the ends of the guide-strips, spring latches disposed above the guide-strips and mounted on the gate frame arranged for engaging in selected apertures of the gate-member for securing the latter stationary in adjusted position relative to said gate frame, cooperating fastening means on the stabilizing strip and gate frame to permit the latter to swing to open or closed position, cooperating devices on the vehicle body and gate frame for maintaining said frame in open position at selected inclination, and keepers carried by said gate frame for engaging in the apertures of said floor extension for securing the gate frame in closed position.

PATRICK RYAN.